United States Patent [19]

Burnham

[11] 4,180,231
[45] Dec. 25, 1979

[54] VIBRATION DAMPENING SUPPORT

[75] Inventor: Lowell C. Burnham, Louisville, Ky.

[73] Assignee: General Electric Company, Louisville, Ky.

[21] Appl. No.: 938,166

[22] Filed: Aug. 30, 1978

[51] Int. Cl.² ............................................. F16F 15/04
[52] U.S. Cl. .................................... 248/632; 248/638
[58] Field of Search ............... 248/632, 634, 635, 638, 248/659, 74 A; 267/141.2, 141.3, 141.4, 141.5; 188/1 B; 62/DIG. 3

[56] References Cited

U.S. PATENT DOCUMENTS

| 1,975,810 | 10/1934 | Trott | 248/659 X |
|---|---|---|---|
| 3,061,253 | 10/1932 | Keaton | 248/74 R |
| 3,191,897 | 6/1965 | Comerer | 248/606 |
| 3,208,700 | 9/1965 | Bloomingdale | 248/624 |
| 3,246,836 | 4/1966 | Ayling | 248/624 X |
| 3,455,525 | 7/1969 | Waermo | 248/635 |
| 3,702,178 | 11/1972 | Schulz | 267/140.3 |
| 3,770,231 | 11/1973 | Kirchgessner et al. | 248/659 X |
| 3,856,245 | 12/1974 | Byerly | 248/74 PB |

FOREIGN PATENT DOCUMENTS

| 1153821 | 3/1958 | France | 188/1 B |
|---|---|---|---|
| 586888 | 4/1947 | United Kingdom | 267/140.1 |
| 1454671 | 11/1976 | United Kingdom | 188/1 B |

Primary Examiner—J. Franklin Foss
Attorney, Agent, or Firm—Frederick P. Weidner; Radford M. Reams

[57] ABSTRACT

A vibration dampening support for mounting a structure horizontally includes a stationary mounting bracket with an inside U-shape configuration and an inwardly projecting lug. There is also an elastomeric bushing located in the mounting bracket with the back wall abutting the lug of the mounting bracket. The bushing includes a top and bottom section connected to each other at the back wall by a hinge and the bushing has a cavity through the front wall to receive the structure to be mounted. The bottom section of the bushing has an outside configuration complimentary to the inside U-shape configuration of the mounting bracket. There is also a strap secured to the mounting bracket and engaging the top section of the bushing.

17 Claims, 5 Drawing Figures

VIBRATION DAMPENING SUPPORT

BACKGROUND OF THE INVENTION

The present invention is directed to a vibration dampening support for mounting a structure horizontally. More particularly, this invention relates to a vibration dampening support for mounting horizontally the support feet of a compressor in a refrigertor.

Various vibration dampening arrangements have been provided for reducing noise and preventing movement of machines and components thereof which are subject to vibration. Commonly, vibration dampening pads such as disclosed in U.S. Pat. No. 3,477,674 have been used for these purposes. A vibration dampening support for mounting a structure having a shaft that passes through a circular dampening means made of rubber or other elastic material is described in U.S. Pat. No. 3,455,525. A conduit supporting clip having a pair of hingedly inter-connected cushion strap sections is described in U.S. Pat. No. 3,061,253. It is also known in the art that bushings having a cup-like configuration may be used for hinges of a door as described in U.S. Pat. No. 3,065,035.

By the present invention, there is provided an improved vibration dampening support for mounting a structure and particularly for mounting the structure in a horizontal position such as in the case of support feet of a compressor of a household refrigerator.

SUMMARY OF THE INVENTION

There is provided a vibration dampening support for mounting a structure horizontally, including a stationary mounting bracket having an inside U-shaped configuration as viewed in lateral cross section and an inwardly projecting lug. Positioned in the mounting bracket is an elastomeric bushing having a top, side, bottom, back and front walls with the back wall abutting the inwardly projecting lug. The configuration of the bushing includes a top and bottom section which are connected to each other at the back wall by a hinge that is perpendicular to the longitudinal axis of the bushing. The bushing also has a cavity through the front wall to receive the structure for mounting. The bottom section of the bushing has an outside configuration which is complimentary to the inside U-shaped configuration of the mounting bracket. There is also provided a strap which is secured to the mounting bracket and engages the top section of the bushing.

DESCRIPTION OF THE PREFERRED EMBODIMENT

Figure 1:
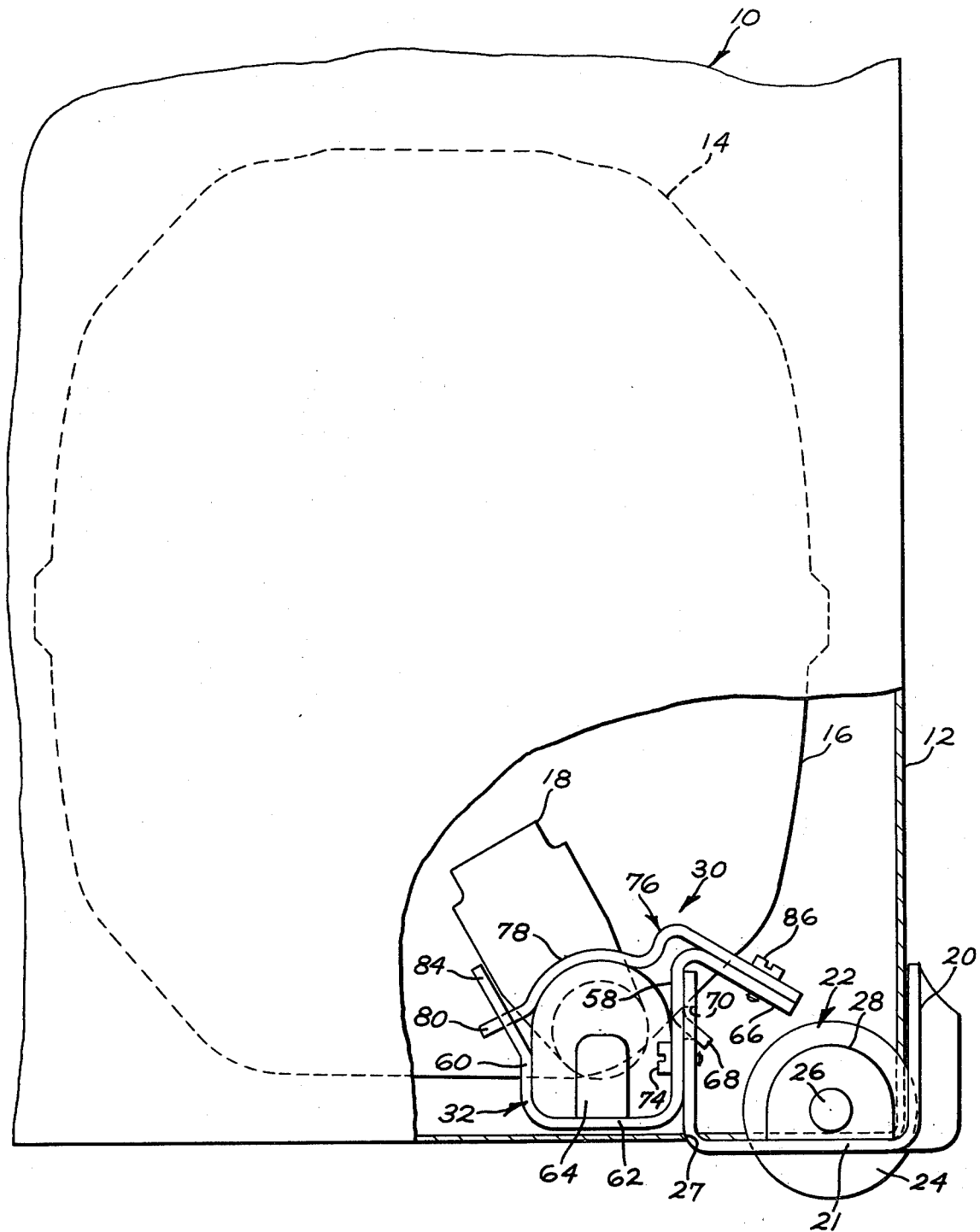
FIG. 1 is a front elevational view, partly broken away, of a refrigerator showing the compressor and the vibration dampening support of the present invention.

Referring to FIG. 1, a portion of a refrigerator 10 such as a household refrigerator, is shown and has within an outer case 12 a compressor 14 having an outer sheel or housing 16. Attached to the compressor housing 16 are a number of support feet 18, one of which is shown in FIG. 1.

Attached to the outer case 12 of the refrigerator 10 is a frame member 20 which extends along the back and at the bottom of the refrigerator. The frame member 20 in many instances carries a roller assembly 22 at each end of the outer case so that the refrigerator may be more easily moved about. The roller assembly includes the roller 24 and axle 26 which is retained in place by an axle support member 28 which may be formed from material making up the frame member 20. The frame member 20 is a channel formed by two vertical walls and an interconnecting bottom wall 21. One vertical wall 23 is located outside the outer case 12 and is normally secured to the outer case 12 by spot welding. The other vertical wall 25 passes through an opening 27 in the outer case 12 and is located within the outer casing 12.

The vibration dampening support assembly 30 of this invention is shown interconnecting the support foot 18 of the compressor 14 and the frame member 20. The details of the vibration dampening support assembly and its arrangement will be discussed subsequently.

Figure 2:
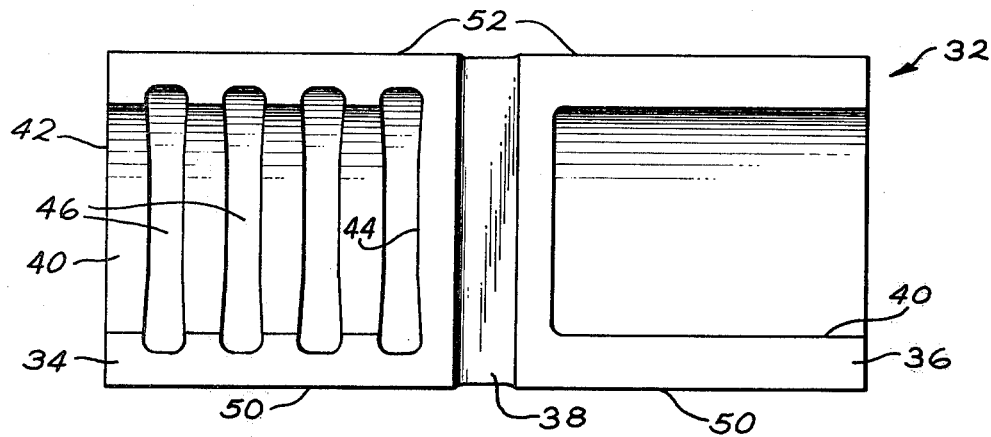
FIG. 2 is a top plan view of the bushing shown in its open position for the vibration dampening support of the present invention.
Figure 3:
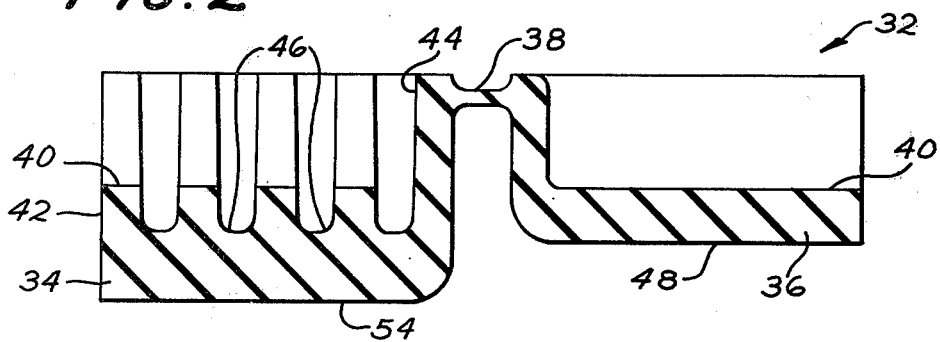
FIG. 3 is a side elevational sectional view of the bushing shown in its open position for the vibration dampening support of the present invention.
Figure 4:
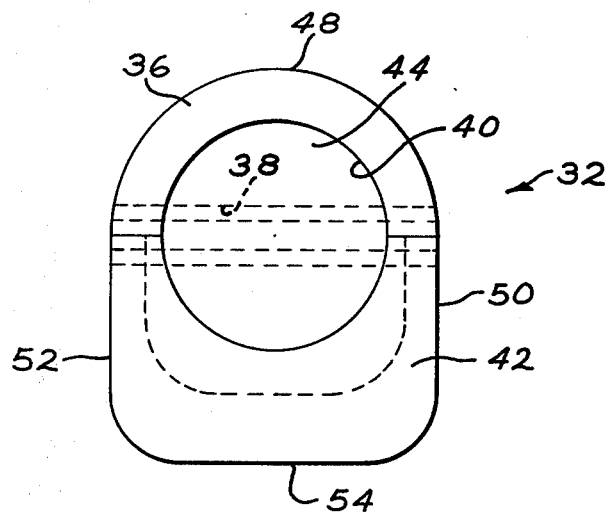
FIG. 4 is a front elevational view of the bushing shown in its closed position for the vibration dampening support of the present invention.

With reference to FIGS. 2–4, there is shown the configuration of the bushing 32 which may be made of any suitable vibration dampening material such as rubber, neoprene or any other suitable elastomeric material. The bushing is formed or molded having a bottom section 34 and a top section 36. Preferably, the bottom section 34 is substantially thicker than the top section 36 for purposes of adding additional vibration isolation for a horizontally mounted structure such as the support foot 18 of the compressor 14. The bottom section 34 and top section 36 are connected to each other by a hinge section 38 which is generally of a thinner dimension to allow the top and bottom sections to be placed one on top of the other as shown in FIG. 4. When the bushing 32 has the top section 36 folded over the bottom section 34, there is a cavity 40 through the front wall 42 which extends to the back wall 44. The bottom section 34 of the bushing 32 may preferably have a plurality of inwardly directed ribs 46. These ribs support the structure to be mounted horizontally and add to the resiliency of the bushing. The top section 36 of the bushing 32 has a top wall 48 which is curved along the longitudinal axis as seen particularly in FIG. 4. The bottom section 34 of the bushing 32 has side walls 50 and 52 which, together with the bottom wall 54, are U-shaped as viewed in lateral cross section, again as shown in FIG. 4. It will be noted that with the above described configuration of the bushing that the top and bottom sections, when folded upon each other, form in effect a "clam shell" arrangement which will capture and hold a structure for mounting within the cavity and surrounding the structure by elastomeric material on all sides except the front wall where the structure must enter the cavity 40.

Figure 5:
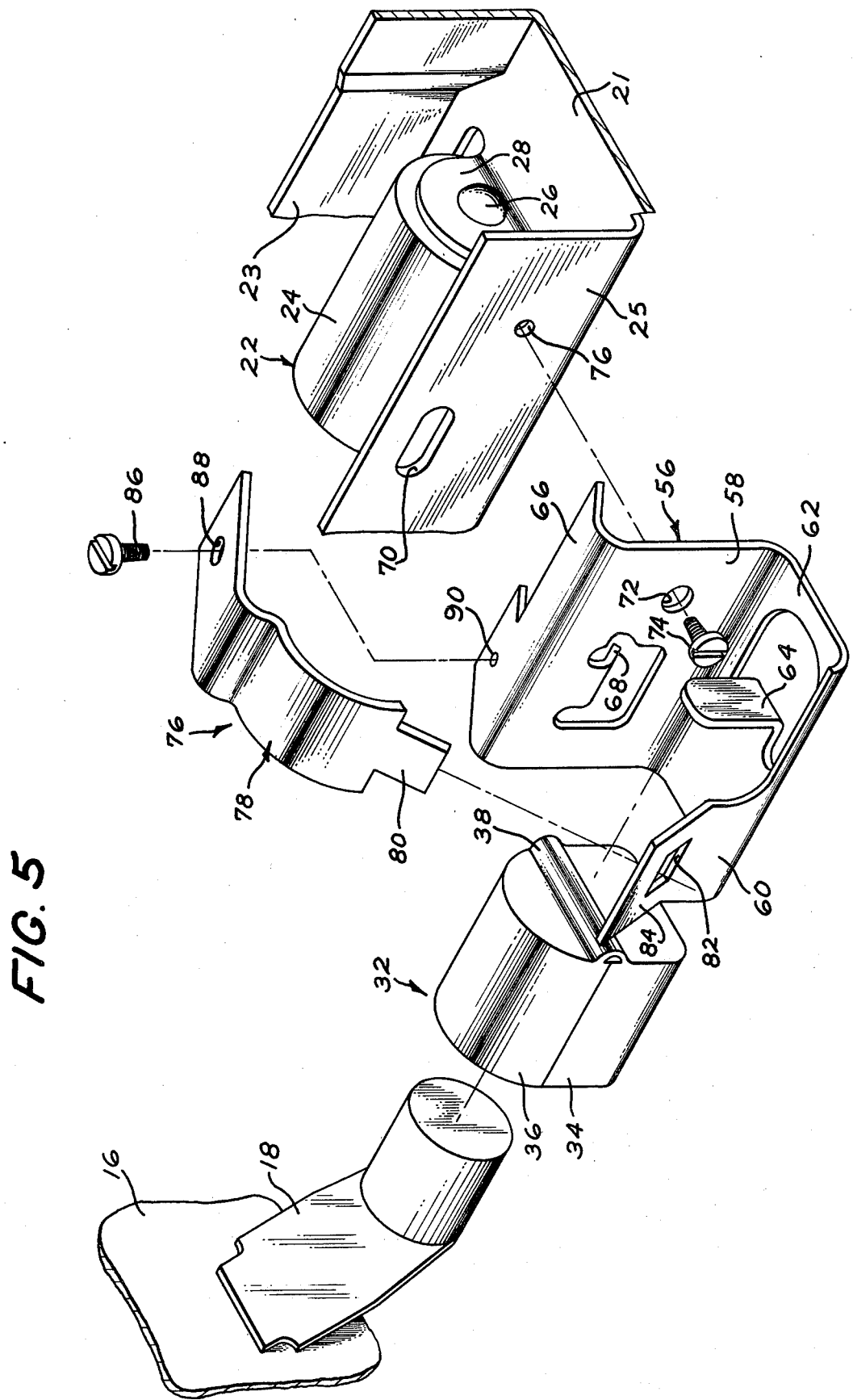
FIG. 5 is an exploded perspective view of the vibration dampening support of the present invention.

With reference to FIGS. 1 and 5, the vibration dampening support assembly 30 members will be further discussed. There is provided a stationary mounting bracket 56 that has an inside U-shaped configuration as viewed in lateral cross section. The stationary mounting bracket 56 includes a vertical leg portion 58 and a second vertical leg portion 60 spaced therefrom by a bottom horizontal portion 62. The bottom portion 62 has inwardly depending therefrom a lug 64 which may be formed from material of the bottom portion 62 as by lancing the material and bending the material to form a lug in a vertical direction relative to the bottom portion 62. The bushing 32 has the U-shaped bottom section 34 received within the stationary mounting bracket 56 and has the back wall 44 of the bushing abutting the lug 64. It will be noted that the U-shaped configuration of the bushing 32 and the U-shaped configuration of the stationary mounting bracket 56 are complimentary so that the bushing snugly fits within the confines of the stationary mounting bracket 56. This is for the purpose of preventing the bushing 32 from rotating about its longitudinal axis during assembly and when functioning as a vibration isolating bushing.

The stationary mounting bracket 56 is secured to the frame member 20 by any suitable means. In the preferred embodiment of this invention, the securing of the stationary mounting bracket 56 is accomplished by providing an outwardly directed tang 68 which may be formed of the material of the vertical leg portion 58 of the stationary mounting bracket 56. The tang 68 is received through a slot 70 which is formed in the vertical wall of the channel frame member 20 which passes through the opening 27 in the bottom of the outer case 12 of the refrigerator. Adjacent to tang 68 there is provided a screw hole 72 through which a screw 74 is received and into a hole 76 formed in the same portion of the frame member as is the slot. Thus, there is a securing means provided between the stationary mounting bracket 56 and the frame member 20 that only requires a single screw, yet it prevents relative movement between the mounting bracket and the frame member.

Included in the vibration dampening support assembly 30 is a strap 76 which extends from one vertical leg portion of the stationary mounting bracket 56 to the other over top of the bushing 32. The strap 76 has a curved section 78 which is complimentary to the curved top wall 48 of the top section 36 of the bushing 32. In the preferred embodiment of the invention, the strap 76 is secured to the stationary mounting bracket 56 by providing a tang 80 at one end of the strap 76 adjacent the curve portion 78. The tang 80 is of less width than the rest of the strap. The tang 80 is received in a slot opening 82 that is formed in one vertical leg portion 60 of the stationary mounting bracket 56. Preferably, the upper section 84 of the leg portion 60 containing the slot opening 82 diverges outwardly from the lower portion of the vertical leg portion 60. The opposite end of the strap 76 is secured to the opposite vertical leg portion 58 of the stationary mounting bracket 56 as by a screw 86 passing through a screw hole 88 in the strap and into a receiving screw hole 90 formed in an outwardly depending flange 66 located at the top of vertical portion 58.

By the vibration dampening support assembly described above and shown in the drawings, a structure to be mounted horizontally may be easily assembled and includes a vibration dampening arrangement. Moreover, the structure to be mounted to the dampening support assembly and the support assembly secured in turn to a supporting structure may be assembled with only two screws.

The foregoing is a description of the preferred embodiment of the invention and it should be understood that variations may be made thereto without departing from the true spirit of the invention as defined in the appended claims.

What is claimed is:

1. A vibration dampening support for mounting a structure horizontally comprising:
   (a) a stationary mounting bracket having an inside U-shape configuration as viewed in lateral cross section and an inwardly projecting lug,
   (b) an elastomeric bushing having a top, sides, bottom back and front walls located in the mounting bracket with the back wall abutting the lug, said bushing including;
      (i) a top and bottom section which are connected to each other at the back wall by a hinge that is perpendicular to the longitudinal axis of the bushing,
      (ii) a cavity through the front wall to receive the structure for mounting,
      (iii) the bottom section having an outside configuration complimentary to the inside U-shape configuration of the mounting bracket, and
   (c) a strap secured to the mounting bracket and engaging the top section of the bushing.

2. The vibration dampening support of claim 1 wherein the bottom section of the bushing is substantially thicker than the top section.

3. The vibration dampening support of claim 1 wherein the bottom section of the bushing has a plurality of inwardly directed ribs.

4. The vibration dampening support of claim 1 wherein the top section of the bushing is curved outwardly along the longitudinal axis and the strap has a complementary curvature section that engages the top section.

5. The vibration dampening support of claim 1 wherein one side of the mounting bracket has a slot and the strap is secured to the bracket by one end passing through the slot and the other end fastened by a screw to the opposite side of the bracket.

6. The vibration dampening support of claim 5 wherein the bracket has an outwardly depending flange to which the end of the strap fastened by a screw is secured.

7. The vibration dampening support of claim 5 wherein the end of the strap passing through the slot is of less width than the rest of the strap.

8. The vibration dampening support of claim 5 wherein the slot is located in the upper portion of said one side of the mounting bracket and the upper portion diverges outwardly from the other portion of the said one side.

9. A vibration dampening support for mounting horizontally a support foot of a compressor in a refrigerator having a support frame comprising:
   (a) a stationary mounting bracket secured to the frame of the refrigerator, said bracket having an inside U-shape configuration as viewed in lateral cross section and an inwardly projecting lug,
   (b) an elastomeric bushing having a top, sides, bottom, back and front walls located in the mounting bracket with the back wall abutting the lug, said bushing including:
      (i) a top and bottom section which are connected to each other at the back wall by a hinge that is perpendicular to the longitudinal axis of the bushing, (ii) a cavity through the front wall to receive the compressor foot for mounting, (iii) the bottom section having an outside configuration complimentary to the inside U-shape configuration of the mounting bracket, and (c) a strap secured to the mounting bracket and engaging the top section of the bushing.

10. The vibration dampening support of claim 9 wherein the bottom section of the bushing is substantially thicker than the top section.

11. The vibration dampening support of claim 9 wherein the bottom section of the bushing has a plurality of inwardly directed ribs.

12. The vibration dampening support of claim 9 wherein the top section of the bushing is curved outwardly along the longitudinal axis and the strap has a complimentary curvature section that engages the top section.

13. The vibration dampening support of claim 9 wherein one side of the mounting bracket has a slot and the strap is secured to the bracket by one end passing through the slot and the other end fastened by a screw to the opposite side of the bracket.

14. The vibration dampening support of claim 13 wherein the bracket has an outwardly depending flange to which the end of the strap fastened by a screw is secured.

15. The vibration dampening support of claim 13 wherein the end of the strap passing through the slot is of less width than the rest of the strap.

16. The vibration dampening support of claim 13 wherein the slot is located in the upper portion of said one side of the mounting bracket and the upper portion diverges outwardly from the other portion of the said one side.

17. The vibration dampening support of claim 16 wherein the refrigerator frame has a slot and the mounting bracket has a lug in the side wall thereof depending outwardly from the bracket and is received in the refrigerator frame slot with a single screw passing through the mounting bracket and refrigerator frame.

* * * * *